July 21, 1953     T. N. G. LIDMALM ET AL     2,646,234
TRIMABLE SERVO TAB WITH BALANCED, ANTIBALANCED, AND
SPRING TAB ACTION INTENDED ESPECIALLY FOR AIRCRAFT
Filed Dec. 26, 1950
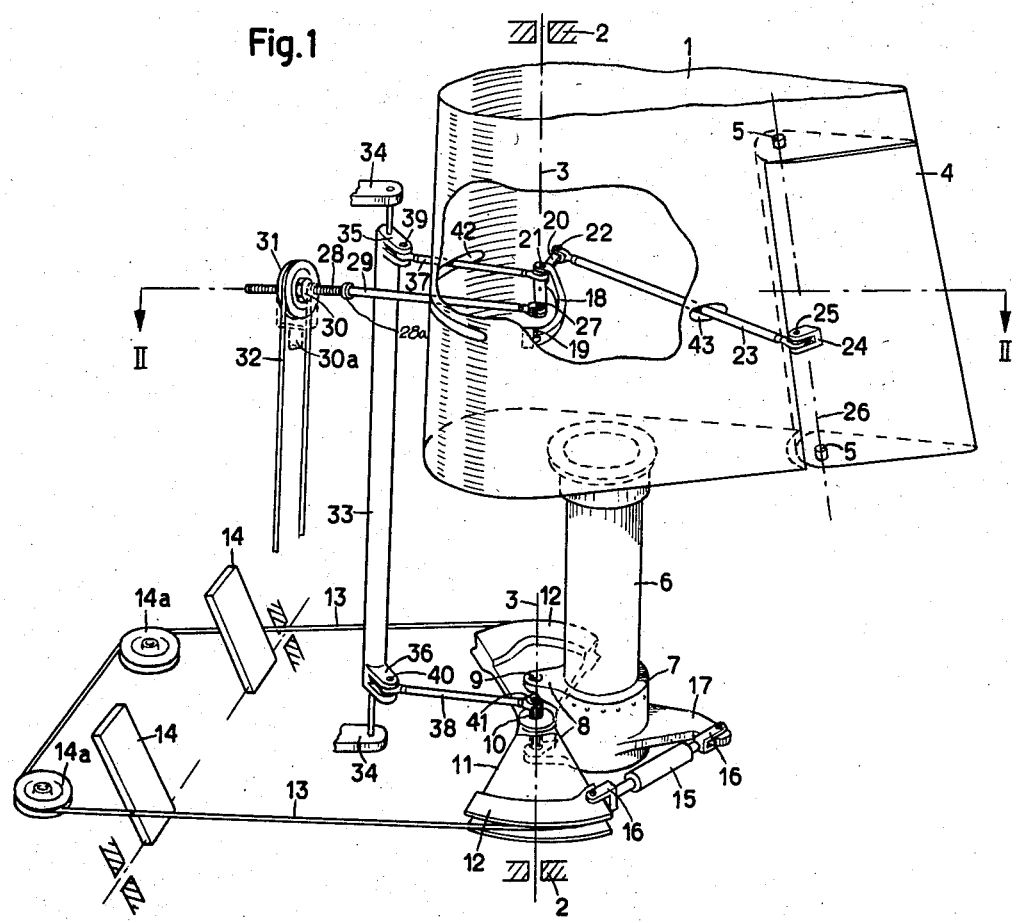
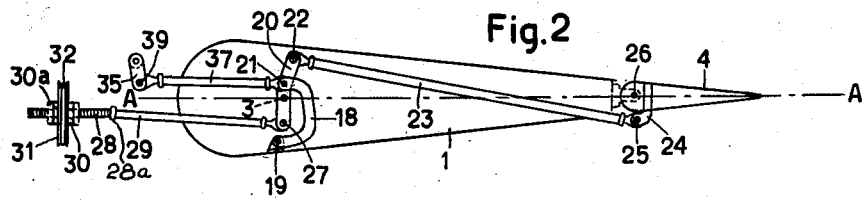
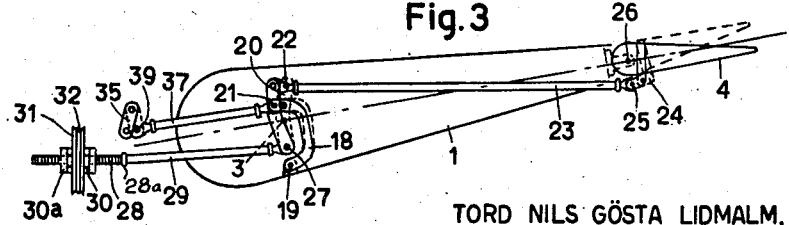
TORD NILS GÖSTA LIDMALM, INVENTORS
NILS FOLKE LENNART BENGTSSON.
BY
ATTORNEYS Patented July 21, 1953

2,646,234

UNITED STATES PATENT OFFICE 2,646,234

TRIMABLE SERVO TAB WITH BALANCED, ANTIBALANCED, AND SPRING TAB ACTION INTENDED ESPECIALLY FOR AIRCRAFT

Tord Nils Gösta Lidmalm and Nils Folke Lennart Bengtsson, Linköping, Sweden, assignors to Svenska Aeroplan Aktiebolaget, Linköping, Sweden, a joint-stock company of Sweden Application December 26, 1950, Serial No. 202,598
In Sweden January 4, 1950

3 Claims. (Cl. 244—82)

This invention relates to movable aircraft control surfaces having tabs hinged thereto and relates more particularly to a tab actuating mechanism for automatically controlling the tab with respect to the movable control surface.

In high speed and heavy aircrafts the force applied by the pilot for turning the movable control surface through larger angles of displacement are frequently of such magnitude that it is necessary or desirable to provide auxiliary means to assist the pilot in operating the control surface. For this purpose there is mounted on the rear edge of the control surface a servo tab or flap which is arranged to move in a direction opposite to that of the control surface, when the conditions are such that the force of air stream against which the control surface is to be moved is excessive. To control this relative movement of the control surface and the servo tab in response to air loads acting upon the control surface various mechanisms have been introduced. In mechanisms of this kind a gearing linkage arrangement, connecting the tab and the control surface with the control surface operating means, is combined with a spring unit or other yielding connection to provide a combined "spring" and "geared" tab. In addition, to set the position of the tab relatively to the control surface such mechanisms are often combined with a trim adjustment device to provide a "trim" tab. Common to these prior mechanisms is that the gearing linkage arrangement is at least in part suspended from and acts upon a stationary part of the aircraft, for instance the trim adjustment device.

The main object of the present invention is to provide in mechanisms of the above character a gearing linkage arrangement of such a structure as to enable the linkage to be entirely suspended from and movable together with the movable control surface, whereby the mounting of the linkage will be convenient and light as compared with prior linkage arrangements with a supporting structure outside the movable control surface.

Another object of the invention is to provide a linkage arrangement in the control surface as above, wherein the linkage arrangement is of simple structure so as to reduce the number of links to a minimum.

The foregoing and other objects and advantages will become apparent from the following description of the typical embodiment of the invention shown in the accompanying drawings in which:

Figure 1 is a perspective view of a tab actuating mechanism applied to a rudder of an aircraft and connected to the rudder control operating means, the rudder being shown with broken lines.

Figure 2 is a cross sectional view taken substantially as indicated by line II—II on Figure 1.

Figure 3 is a diagrammatic view showing the rudder in a deflected position and the tab in different angular positions relatively to the rudder.

In the drawings 1 is a control surface in the form of a rudder which is journalled in spaced bearings 2 and turnable around an axis denoted by the dash dotted line 3. A tab 4 is arranged at the trailing edge of the rudder 1 and is mounted on hinges 5 in such a manner as to have angular movement relatively to the rudder 1 in both directions from the neutral position shown in Figures 1 and 2 of the drawings. To the bottom portion of the rudder 1 is attached a post 6 the lower end of which is rigidly fixed to a bracket 7 having two radially extending arms 8, positioned one above the other and formed with axially aligned holes 9 providing journals for a fixed shaft 10 the axis of which is coaxial with the rotation axis 3 of the rudder 1. A lever 11 comprising a pair of diametrically disposed cable sector parts 12 is rotatably fixed to the shaft 10 between the arms 8 and thus rotatably mounted relative to the rudder 1. Each cable sector part 12 is grooved along its outer curved periphery and in the grooves is laid a cable 13, which is anchored at the ends to the cable sector parts 12 and runs to the aircraft control compartment (not shown), where the cable 13 is connected to the pilot operated control means, such as pedals 14, and run around guide pulleys 14a as diagrammatically shown in the drawing.

A two-way acting spring unit 15 is arranged at the side of the bracket 7 and anchored by suitable means, such as forks 16, at one end to the outer end of an arm 17 projecting radially from the bracket 7 and at the other end to the outer portion of one of the cable sector parts 12. As this spring unit may be of any kind known and does not form a part of our invention per se it will not be described here and shown in detail in the accompanying drawings. It might be sufficient to point out that such a spring unit contains a spring element which tends to hold the distance between the arm 17 and the cable sector part 12 constant and is adapted to be compressed or extended axially when the resistance in turning the rudder 1 in an anti-clockwise and clockwise direction respectively by means of the cable control system exceeds the initial tension of the spring element. Of course upon removal of such axial forces the spring restores the spring unit to its normal length and thereby restores the initial relationship between arm 17 and sector part 12.

In the rudder 1 there is mounted a gearing linkage arrangement including a curved steering arm 18, which is pivotally supported at one end on a pin 19 extending parallel with the rudder axis 3 in spaced relation to the longitudinal centre line A—A of the rudder 1, so that the steering arm 18 upon movement will swing relatively to the rudder in a plane normal to the axis 3. A two-armed lever 20 is pivotally mounted on another pin 21, carried by the other free end of the steering arm 18 on opposite side of the centre line A—A relatively to the pin 19. One arm of this lever projects outwardly and slightly rearwardly from the pivot pin 21 and is pivotally connected by a pin 22 to one end of a push-pull rod 23, extending rearwardly to the tab 4 and connected thereto by means of a lug 24 and a pivot pin 25, carried by the lug in spaced relation to the rotation axis of the tab as indicated by the dash dotted line 26 in the drawings. The other arm of the lever 20 is coupled to a trim adjustment device by means of a pivot pin 27, the axis of which being disposed in spaced relation to the axis 3 on opposite side of the centre line A—A relatively to the pivot 21. In the embodiment shown the trim adjustment device comprises a screw threaded shank 28 which by means of a ball and socket joint 28a is attached to one end of a substantially axially aligned rod 29, the other end of which is connected to the above mentioned lever arm by means of the pivot pin 27. The shank 28 engages with a screw threaded nut 30 which is rotatably mounted on a stationary part of the aircraft, such as fork 30a, and carries a pulley 31 rigidly attached to the nut 30. The nut is adapted to be rotated by cables 32 laid on the pulley and extending to the pilot's compartment. It will be seen that upon rotation of the nut 30 the shank 28 is moved either fore or aft to change or adjust through rod 29 the position of the pivot 27 of the lever 20 and thereby the position of the tab through lever 20 and rod 43.

The linkage arrangement is adapted to be actuated by the lever 11 through the following connection. An upright torsion tube 33 is rotatably mounted at its ends in bearings 34 attached to stationary parts of the aircraft for rotation about an axis parallel with and spaced from the rudder axis 3. The ends of the torsion tube are provided with upper and lower crank arms 35 and 36 respectively, each of which being adapted to receive one end of a connecting rod 37 and 38 respectively, pivotally mounted on the crank arms by means of pivot pins 39 and 40. The connecting rods 37 and 38 are of substantially the same length and are disposed one above the other in planes normal to the rudder axis 3 and are at their other ends pivotally connected respectively to the free end of the steering arm 18 by means of pin 21 and to one of the cable sector parts 12 by a pin 41 disposed substantially right below the pin 21 on the same side of the rudder axis as this pin 21. As shown in the drawings the rods 29 and 37 are on the same level and run through a horizontal slot 42 in the skin of the forward part of the rudder 1 while rod 23 passes through a rear opening 43 in the skin of the rudder.

In operation of the mechanism it will be assumed that the trim adjustment device is preset so that the rudder 1 and the tab 4 are in the aligned neutral position as illustrated in Figures 1 and 2 of the drawings. It will further be assumed that the upper one of the pedals 14 is actuated by the pilot. A pull is thus applied to the upper cable 13 causing an anti-clockwise turning movement of the cable segment 11. If the pedal force is less than the tension of the spring in the spring unit 15, which is the case at small rudder deflections when air loads on the rudder are small, the spring unit 15 will hold the lever 11 and the rudder 1 against relative movement, so that the rudder lever assembly will move together about the rotation axis 3 of the rudder 1. The turning movement of the lever 11 causes a thrust on the connecting rod 38, which moves the connecting rod 38 to the left in the drawings and hence rotates the torsion tube 33 clockwise whereby connecting rod 37 moves the central lever pivot 21 to the left. However, this pivot 21 is also moved to the left by the turning movement of the rudder anti-clockwise about the rotation axis 3. For explanation of the operation of the mechanism we presume that the leverage ratio is such that the movement of the pivot 21 by the lever 11 through connecting rod 38, torsion tube 33 and connecting rod 37 is equal to the movement of the pivot 21 in consequence of turning movement of the rudder about axis 3. No relative movement of the pivot 21 with respect to the rudder 1 would then occur. If the pivot 27 of the lever 20 were disposed coaxially with the axis 3 of the rudder 1 no deflection of the tab in relation to the rudder would be obtained. However, as previous described, the relatively fixed pivot 27 is positioned on opposite side of the centre line A—A relatively to the pivot 21 and consequently the latter pivot 21 moves forwardly in relation to the rudder 1, when the latter is moved anti-clockwise as supposed. The lever 20 is thereby swung in a clockwise direction and consequently the tab 4 is turned anti-clockwise relatively to the rudder. The tab 4 is now operating as a "geared" tab with anti-servo action as shown by dotted lines in Figure 3.

To make the following operation easier to understand it will be described as occurring step by step although in fact the operation proceeds continuously.

When by further depressing the pedal 14 the force for turning the rudder 1 against air loads reacting thereupon exceeds the tension of the spring in the spring unit 15 the rudder movement is discontinued and only the lever 11 continues to move anti-clockwise against the action of the spring, which is hereby compressed. As the rudder 1 is stationary during this continuous rotation of the lever 11 there will be no relative movement of the pivot 27 and the rudder 1. In this case the pin 27 provides a pivot centre for the lever 20 and the pivot 21 is now moved to the left by the lever 11 through connecting rod 38, torsion tube 33 and connecting rod 37. The lever 20 is thus swung anti-clockwise and consequently the tab 4 is turned clockwise from its anti-servo position towards a reversed position wherein the tab is deflected in opposite direction relatively to the rudder 1 as shown by full lines in Figure 3. The air stream will now act upon the tab 4 to move the rudder 1 anti-clockwise, i. e. in the direction desired. The turning of the rudder 1 has no effect upon the lever 11 as the compressed spring in unit 15 now extends in the rudder movement direction until the initial relationship between arm 17 and sector part 12 is restored. As will be apparent from the previous description the lever 20 will now move clockwise relatively to the rudder 1 and the tab 4 will hereby deflect in anti-clockwise direction until the air loads on the rudder again becomes excessive, when the spring is again compressed and the tab deflected in the servo direction. The tab has now operated as a combined "geared" and "spring" tab. Of course as earlier stated the movement of the tab 4 occurs continuously and the particular position of the tab at a certain moment is determined by the instantaneous forces acting upon the rudder. Although operation of the tab is explained for rudder deflections in one direction only, it is obvious that operation of the tab will be the same for rudder deflections in opposite direction though this operation of course will be reversed.

From the foregoing description it will be observed that the location of the pivot 27 in relation to the centre line A—A, the rudder axis 3 and the pivot 21 influences the function of the mechanism in the following way:

Pivot 27 is located on the opposite side of centre line A—A relatively to pivot 21. A "geared" tab with anti-servo action may be obtained.

The neutral position of the control surface can be trimmed, e. g. during flight, which is effected by the above described trim adjustment device. By pulling one of the other of the cables 32 the nut 30 is rotated, whereby screw shank 30 and rod 29 are axially displaced. As will be seen lever 20 is thereby swung about centre pivot 21, which causes a movement of the push-pull rod 23 and thus a deflection of the tab 4 to the position wanted.

Having described only one typical form of the invention we do not wish to be limited to the specific details set forth but wish to reserve to ourselves any variations of modifications that may appear to those skilled in the art and fall within the scope of the following claims.

What is claimed is:

1. In an aircraft, a control surface pivotally connected at its forward edge to the aircraft for movement about a given axis, a tab hinged to the trailing edge of the control surface, a lever, a steering means supported by the control surface and extending in a plane normal to said given axis, a pivotal connection between the lever and the steering means, said lever being supported by the steering means for bodily movement of the lever in said plane and turning movement of the lever in relation to the steering means, a rod means, a pivot connecting one end of the rod means with the lever at an axis spaced from said pivotal connection, a universal joint connecting the other end of the rod means with a fixed part of the aircraft, a push-pull rod operatively connected at one end with the tab and pivotally connected at its other end with the lever in spaced relation to said pivot, control means operable by the pilot, a second lever pivotally mounted on the control surface for movement about said given axis and connected to said control means to be operated thereby, a pre-loaded two-way acting spring unit operating between the control surface and said second lever to cause coordinated and relative angular movements of the control surface and said second lever in response to loads acting thereupon, and transmission means interconnecting said second and first levers to transfer movements from said second lever to said first lever.

2. In an aircraft, a control surface pivotally connected at its forward edge to the aircraft for movement about a given axis, a tab hinged to the trailing edge of the control surface, a lever, a steering means supported by the control surface and extending in a plane normal to said given axis, a pivotal connection between the lever and the steering means, said lever being supported by the steering means for bodily movement of the lever in said plane and turning movement of the lever in relation to the steering means, means for trimming the position of the tab relatively to the control surface, a rod means, a pivot connecting one end of the rod means with the lever at an axis spaced from said pivotal connection, a universal joint connecting the other end of the rod means with said trimming means, a push-pull rod operatively connected at one end with the tab and pivotally connected at its other end with the lever in spaced relation to said pivot, control means operable by the pilot, a second lever pivotally mounted on the control surface for movement about said given axis and connected to said control means to be operated thereby, a pre-loaded two-way acting spring unit operating between the control surface and said second lever to cause coordinated and relative angular movements of the control surface and said second lever in response to loads acting thereupon, and transmission means interconnecting said second and first levers to transfer movements from said second lever to said first lever.

3. In an aircraft, a control surface pivotally connected at its forward edge to the aircraft for movement about a given axis, a tab hinged to the trailing edge of the control surface, a steering arm pivotally supported at one end by the control surface at an axis spaced at one side of said given axis, a two-armed lever pivotally supported by the other end of the steering arm at an axis spaced at the other side of said given axis, trim adjustment means for trimming the position of the tab relatively to the control surface, said trim adjustment means being mounted stationary on the aircraft, a rod universally pivotally connected at one end with the trim adjustment means and pivotally mounted at its other end with one arm of the lever at an axis spaced at said one side of said given axis, a push-pull rod pivotally connecting the other arm of the lever with the tab, control means operable by the pilot, a second lever pivotally mounted on the control surface for movement about said given axis and connected to said control means to be operated thereby, a pre-loaded two-way acting spring unit connected between the control surface and said second lever to cause coordinated and relative angular movements of the control surface and said second lever in response to loads acting thereupon, transmission means comprising a torsion tube rotatably mounted on stationary parts of the aircraft, and rods pivotally connecting the torsion tube with said other end of the steering arm and with said second lever respectively to transfer angular movements from said second lever to said first lever.

TORD NILS GÖSTA LIDMALM.
NILS FOLKE LENNART BENGTSSON.

References Cited in the file of this patent

UNITED STATES PATENTS

| Number | Name | Date |
|---|---|---|
| 2,431,529 | Wendt | Nov. 25, 1947 |
| 2,557,426 | George | June 19, 1951 |

FOREIGN PATENTS

| Number | Country | Date |
|---|---|---|
| 542,944 | Great Britain | Feb. 3, 1942 |
| 595,298 | Great Britain | Dec. 2, 1947 |

OTHER REFERENCES

"Aircraft Engineering" October 1947, p. 316, British Magazine, vol. XIX, No. 224. Copy in Div. 22.